Feb. 24, 1959
J. T. ADAMS
2,874,928
VALVE
Filed Sept. 29, 1953
3 Sheets-Sheet 1
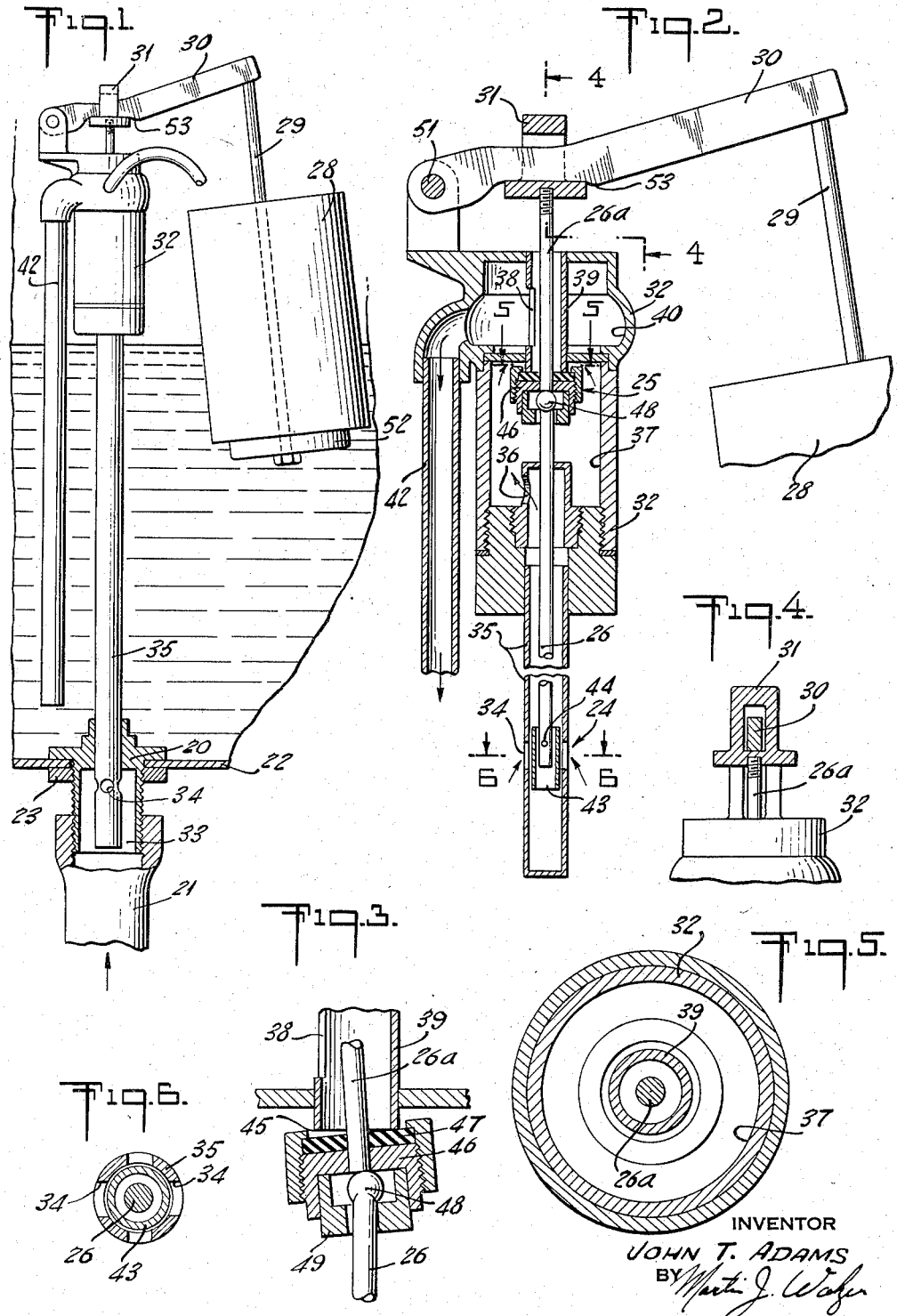
INVENTOR
JOHN T. ADAMS
BY
ATTORNEY

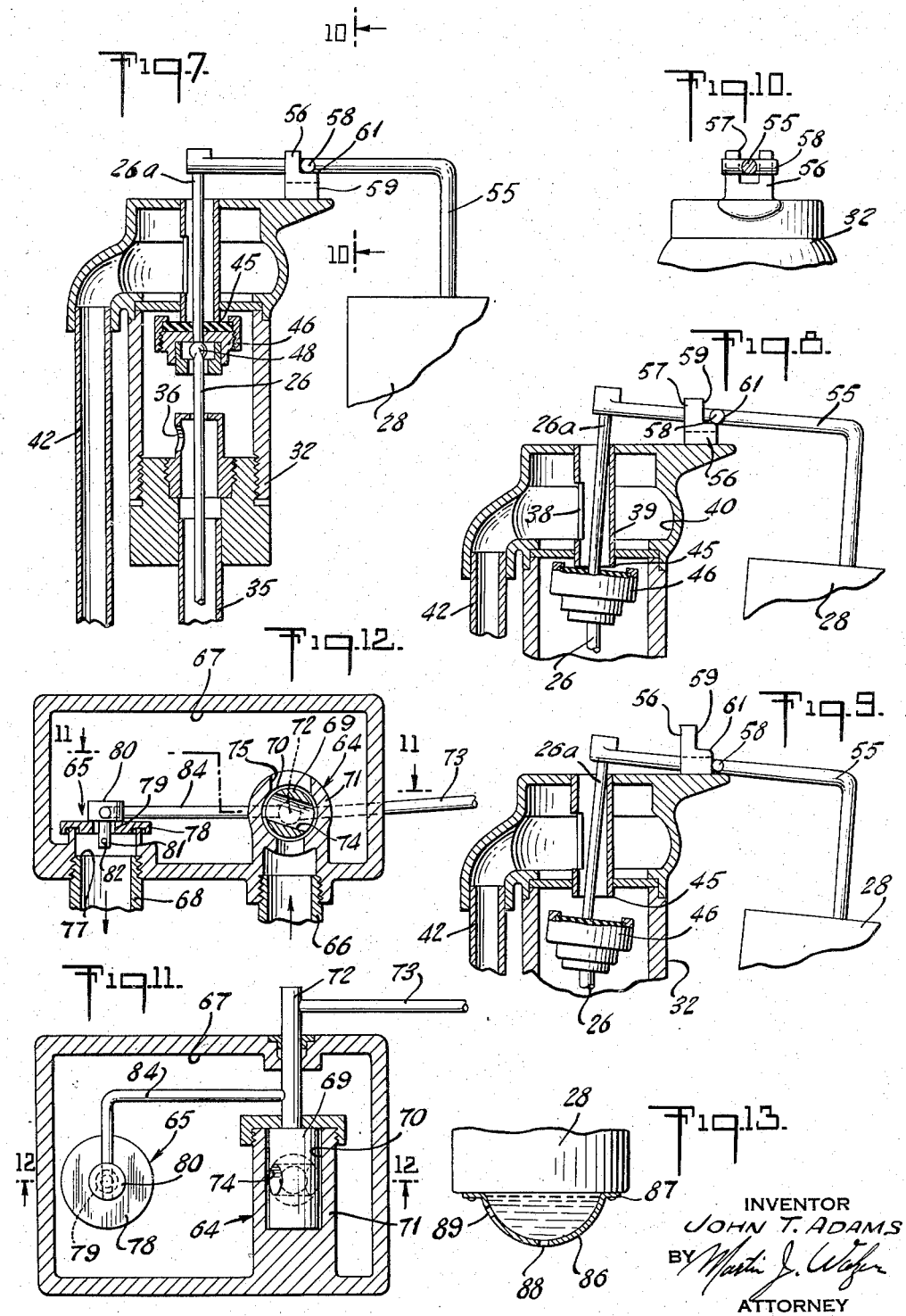

Feb. 24, 1959   J. T. ADAMS   2,874,928
VALVE
Filed Sept. 29, 1953   3 Sheets-Sheet 3
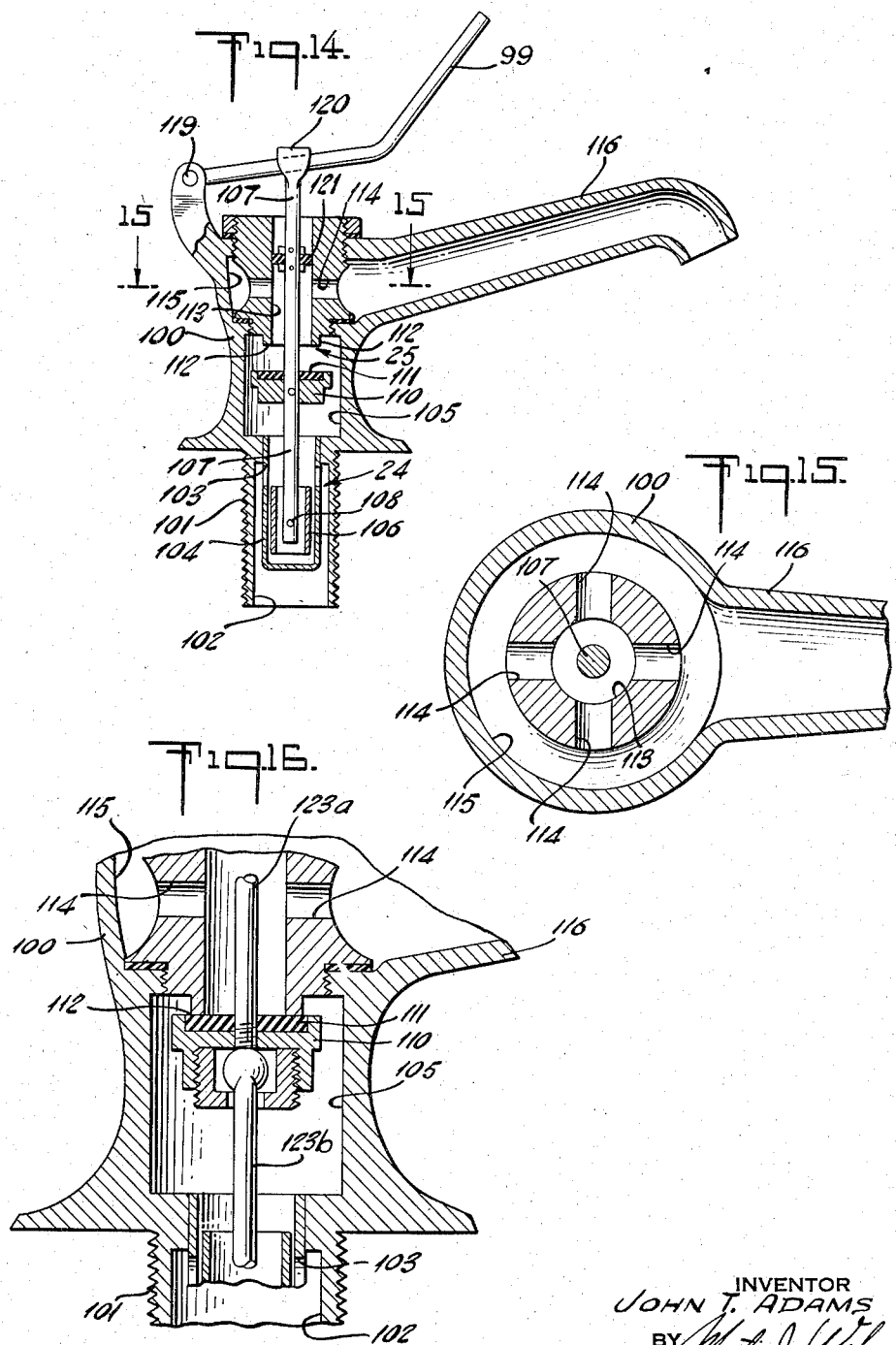
INVENTOR
JOHN T. ADAMS
BY
ATTORNEY 2,874,928
Patented Feb. 24, 1959

United States Patent Office

2,874,928
VALVE

John T. Adams, Brookville, N. Y.

Application September 29, 1953, Serial No. 382,932

11 Claims. (Cl. 251—120)

The present invention relates to a valve and more particularly to a two-stage tandem valve adapted to eliminate water hammer and to reduce noise of closing to a minimum.

It is an object of the present invention to provide a valve which may be used to rapidly cut off the flow of a fluid, which flow may be under substantial pressure and to accomplish this rapid termination of flow without inducing hammer in the line carrying the fluid and reducing the other noises of closure to a minimum.

It is well known that the noises created by a valve during closure result from the forcing of the fluid under pressure through the gradually more restricted opening of the valve as it moves from the full open position to the closed position. By reducing the time increment between the position of full opening and the fully closed position to a minimum, the noise generated on closure can also be reduced to a minimum.

However, where the fluid in a line is under pressure, rapid closure of the valve may induce hammer in the line, which hammer not only will create more noise than that attempted to be eliminated by the rapid closure but also can have other deleterious effects on the system of which the valve referred to is a part.

It is, therefore, one of the primary objects of the present invention to provide a valve which will permit rapid closure, thereby substantially reducing the noise of closure, while at the same time completely eliminating hammer which might be induced by such rapid closure.

It is the further object of the present invention to provide a valve structure which is simple in construction and which, therefore, may be manufactured in mass production and in an inexpensive manner.

It is still another object of the invention to provide a valve which will not leak and which will, through a long operating life, maintain a fidelity of service with little or no maintenance attention.

In the embodiment of the invention herein illustrated, the final closure of the valve is accomplished by having a valve plate, or cover, seated against the valve seat with line pressure acting to urge the valve plate against the valve seat. This type of closure from the inside of the line will reduce the wear of the washer or other resilient member located between the valve plate and valve seat very substantially as compared with conventional valves. In conventional valves, the valve plate is forced down on the valve seat against line pressure, with the line pressure urging the valve plate away from the valve seat. In order to insure against leakage in the conventional closing mechanism, it is necessary to seat the valve plate against the valve seat with great force, distorting the washer excessively and subjecting it to other excessive wear factors.

A valve having the advantages of the present invention is well suited for use as a toilet tank filler valve, since in this application of the valve, the elimination of the noise of closure and of hammer is of paramount importance.

A valve embodying the present invention will permit the tank to fill at the maximum rate of flow up to the very last instant before final closure. In conventional valves for toilet tanks, since it is necessary in order to prevent water hammer to close the valve gradually, the rate of flow is gradually reduced a substantial time before final closure.

The present invention has the further advantage in use as a toilet tank filler valve in that its use eliminates the necessity of a lengthy arm to support the float. The elimination of this lengthy arm and float permits the employment of simpler flush mechanisms, since the lengthy arm and float in the conventional models interferes with the flush mechanism. Moreover, without the necessity for a lengthy arm to support the float, the toilet tank may be redesigned permitting more compact and attractive shapes having the same volumetric capacity as those presently in use, but smaller and more attractive in appearance.

The embodiments of the present invention illustrated and described herein are adaptations thereof for a toilet tank filler valve and for a faucet. It must be pointed out, however, that valves embodying the present invention may be readily adapted for many other purposes. They may be used wherever the control of a fluid under pressure is desired along with the reduction of noise closure and the elimination of hammer. The structure herein illustrated is particularly adaptable for use in a valve at the end of a fluid supply line where the line empties into a large container or the like.

These and other objects and advantages of the present invention will be more readily understood from the following description and drawings thereof in which drawings:

Fig. 1 is an elevational view of a float controlled toilet tank filler valve embodying the present invention;

Fig. 2 is a sectional, enlarged view in the plane of the drawing taken along the vertical axis of the valve shown in Fig. 1;

Fig. 3 is an enlarged detailed view of the final closure stage showing the valve in a cracked, or slightly open, position;

Fig. 4 is a sectional view taken along line 4—4 at Fig. 2;

Fig. 5 is an enlarged sectional view taken along line 5—5 on Fig. 2;

Fig. 6 is an enlarged sectional view taken along line 6—6 on Fig. 2;

Figs. 7, 8 and 9 are views similar to Fig. 2 showing another embodiment of the invention in various stages of closure;

Fig. 10 is a sectional view taken along line 10—10 on Fig. 7;

Fig. 11 is a sectional plan view of still another embodiment of the present invention taken along line 11—11 on Fig. 12;

Fig. 12 is a sectional view thereof taken along line 12—12 of Fig. 11;

Fig. 13 is an enlarged partially broken away view of a float adaptable for use in valve structures embodying the present invention;

Fig. 14 is a sectional view similar to Fig. 2 showing still another embodiment of the invention;

Fig. 15 is a sectional view taken along line 15—15 on Fig. 14; and

Fig. 16 is an enlarged, partially broken away, sectional view showing the secondary closure member of a modification of the embodiment illustrated in Fig. 14.

The first embodiment of the invention herein described is an adaptation thereof for use as a valve to control the flow of water in the water storage tank of a toilet.

In the embodiment illustrated in Figs. 1 through 6, the valve is mounted by means of the standard nipple or coupling 20 to inlet pipe 21 and secured to the floor of the toilet water tank 22 by nut 23.

As can be best seen in Fig. 2, the valve consists of an initial or primary closure structure 24 and a secondary or final closure structure 25 linked together to operate in a tandem relationship by rod 26. The movement of rod 26 and, therefore, the actuation of the valve is controlled by float 28 which is secured by rod 29 to arm 30. Arm 30 passes through collar 31 and is pivotally mounted to the housing 32.

To fill the tank 22, water flows in through inlet pipe 21 into chamber 33 to the primary valve closure structure 24. If the primary valve closure structure 24 is in the open position, water will flow through apertures 34 into tube 35 and upwardly through tube 35 out of aperture 36 into chamber 37.

When the secondary closure structure 25 is open, water will continue to flow upwardly from chamber 37 through aperture 38 in short tube 39 and into chamber 40. From chamber 40, the flow continues down hush tube 42 into the tank 22.

The entire valve structure when secured in place in tank 22 by means of coupling 20 is supported by the tube 35.

The primary closure structure 24 in the embodiment illustrated in Figs. 1 through 6 comprises a hollow sleeve 43 open at both the upper and lower ends thereof and pivotally mounted by means of pin 44 to rod 26. Vertical movement of the sleeve 43 relative to the apertures 34 will cause opening and closing of the primary closure structure 24.

The secondary closure structure in the embodiment illustrated comprises a valve seat 45 adapted to be covered by valve plate 46.

As can best be seen from Fig. 3, the secondary closure structure is provided with a resilient member 47 such as a rubber or fiber washer to insure tight fitting of the secondary closure structure and to eliminate any danger of leakage. The valve plate 46 is mounted for universal movement on rod 26a by means of spherical head 48 on rod 26 which fits into pocket formed between the valve plate 46 and retaining member 49. This permits the valve plate 46 to assume the position where the secondary closure structure is slightly open as is illustrated in Fig. 3, without any movement being transmitted to the rod 26. The valve plate 46 is thus permitted by this structure to tilt relative to the valve seat 45. The importance of this tilting of the valve plate 46 relative to the valve seat 45 to permit cracking of the secondary closure structure 25 prior to any other opening of the valve is more fully discussed hereinafter.

Rigidly secured to the valve seat 46 and passing up through the short tube 39 is the rod 26a which is threaded into collar 31.

The valve actuating arm 30 is pivotly mounted on 51 at one end and carries float 28 at the other end.

An important feature of the structure herein illustrated is that after "cracking" of the valve, and during opening, the secondary closure member 25 always presents a greater effective area for flow of fluid than does the primary closure structure.

This is accomplished by having the top of the sleeve 43 extend above the aperture a small distance when the secondary closure structure 25 is in the fully closed position with the resilient member 47 firmly seated against the valve seat 45. Thus, as the secondary closure structure 25 begins to open and move away from the valve seat 45, the sleeve 43 will not uncover apertures 34 until the resilient member 47 has moved away from valve seat 45 a distance equal to the distance between the top of sleeve 43 and the top of aperture 34 as shown in Fig. 2.

It is a salient and important feature of the structure embodying the present invention that the primary closure structure 24 is so constructed that it never completely blocks the flow of fluid therethrough and that even in its fully closed position it always permits some small flow of fluid. In order to accomplish this, in the embodiment illustrated in Figs. 1 through 6, the exterior diameter of the sleeve 43 is slightly smaller than the interior diameter of the tube 35 and, therefore, a passageway permitting the flow of water from the inlet pipe 21 into the tube 35 is presented at all times.

In the embodiment illustrated, action of opening and closing of the valve is controlled by float 28. Of course, in other adaptations of the invention actuation may be caused by any other means such as manual control for use in a faucet.

In operation, when the valve is in the closed position shown in Figs. 1 and 2, the float 28 is supported in its upper position in a normal manner by the fluid within the container, in this case the water within the water storage tank 22. On flushing, the water within the water storage tank 22 flows rapidly out, leaving the float 28 unsupported, thereby causing it to fall. To insure positive action of the valve, a weight such as lead member 52 is secured to float 28 causing the float to drop rapidly as the water support is taken away.

The downward movement of a float is transmitted to arm 30 by float support member 29 and the arm 30 pivots in a clockwise direction around pivot point 51. The movement of the arm 30 is transmitted to the valve rod 26a by means of collar 31.

It should be noted that the lower surface 53 of the arm 30 is shaped at the point of engagement with collar 31 so that the first impulse given to the collar 31 is in a sidewards direction. The surface 53 being a cam surface, so that the downward movement of the arm 30 is transmitted to collar 31 in a sidewards direction. This will cause the secondary closure structure 25 to open a slight amount or "crack" as can be seen in Fig. 3.

As can be appreciated from Fig. 2 the water within chamber 37 is under inlet pressure. This pressure urges valve plate 46 with its resilient member 47 firmly against valve seat 45, and prevents leakage by insuring a tight seal at this point. However, it can be appreciated that a large force would be necessary to move the valve plate 46 away from the valve seat 45, if such movement were to be solely an axial one. However, by tipping the valve plate 46 and thereby cracking the valve so that it is in the slightly open position shown in Fig. 3 the pressure differential between chambers 37 and 40 is overcome. This movement need only be very small, but such movement is essential for proper operation of the valve. It should be noted that the lower end of rod 26a is rigidly secured to the valve plate 46 while the upper end of the rod 26 is secured to the valve plate 46 by means of ball and socket 48 and 49. This permits the secondary closure structure 25 to assume the cracked or tilted position shown in Fig. 3 without disturbing the rod 26.

After cracking of the secondary closure structure 25 or, in other words, tipping of the valve plate 46 and resilient member thereon 47 with relation to the valve seat 45, continued clockwise movement of the arm 30 further depresses the rods 26a and 26 and the opening of the secondary closure member is continued.

No opening of the primary closure member 24 will occur, except for the always permitted leakage, until the resilient member 47 has moved away from the valve seat 45 a distance equal to the distance by which the top of the sleeve 43 extends beyond the top of apertures 34.

Thus the secondary closure structure 25 will be in a substantially open position before any appreciable flow begins from the primary closure structure 24.

As the rods 26a and 26 continue to move downwardly the sleeve 43 will uncover the apertures 34 in ever increasing amounts and flow will increase from inlet pipe 21 through tube 35, and apertures 36 into chamber 37, through the secondary closure structure 25 and short tube 39 into chamber 40, and down through hush tube 42 into the water storage tank 22.

It should be noted that sleeve 43 is in the form of a hollow cylinder. This permits its downward movement within tube 35 without any piston action and, therefore, requires very little force.

It should also be noted that the effective aperture for flow at the secondary closure structure 25 is, after opening has commenced beyond the stage of "cracking," greater than the effective apertures for flow at the primary closure structure 24.

The valve remains in the fully open position while the toilet flushes and until the flush valve is closed and the water in tank 22 is raised to a position where it begins to support float 28 and urge it upwardly. The flow through the inlet valve herein described continues at full until this occurs.

As the water in the tank urges the float 28 upwardly the arm 30 will rotate in a counter-clockwise direction. The upper side of the arm 30 will engage collar 31 and transmit an upward movement to rods 26 and 26a.

As the rods 26 and 26a move upwardly, the sleeve 43 will begin to cover the apertures 34 and the valve plate 46 will be urged in a direction toward the valve seat 45 and closing of the valve will commence. The ratio of dimensions is such that at all times, except in the instant just prior to complete closure of the secondary closure structure 25, the effective opening for flow in the secondary closure structure 25 is greater than the effective opening for flow in the primary closure structure 24 during closure of the valve.

When the sleeve 43 has completely covered apertures 34, the resilient member 47 on the valve plate 46 is still a small distance away from the valve seat 45.

Substantially, complete closure of the valve occurs when the sleeve 43 is in the last mentioned position where it covers the apertures 34. However, as is pointed out above, leakage is always permitted to occur at the primary closure structure 24, so that a small flow will continue until the secondary closure structure 25 is in the fully closed position.

Further upward movement of rod 26a continues until the resilient member 47 is seated against the valve seat 45. At this instant full closure occurs. It should be noted that line pressure acting on the base of the valve plate 46 will urge the resilient member 47 into firm engagement with the valve seat 45, to insure against any possible leakage of the valve.

The structure incorporated in the device which is described insures against water hammer in the inlet line even though closure is accomplished very rapidly. By having closure occur in two stages with the first stage always permitting some leakage, followed by a complete closure, an increment of time after the reduction of flow down to the small leakage permitted around sleeve 43, insures against water hammer.

By adjusting the size of the float 28 and the position of collar 31 relative to the pivot point 51 of arm 30, substantially any rate of closure desired can be obtained.

Since most of the noise of closure occurs when the valve is in position just short of its fully closed position, means are provided to increase the rate of closure at that time. It should be noted that if no external means to increase the rate of closure is provided, the rate of closure will be at its slowest because the rate of closure is dependent upon the rate of flow into the tank. As can be appreciated, when the valve is close to its fully closed position, the rate of flow is reduced.

To accomplish this increased rate of closure at the time when the valve is almost fully closed, the float 28 is shaped and constructed of such a material that the center floatation is located substantially beneath the center of gravity. The movement of the float 28 is restricted by arm 30 and as it is buoyed upwardly by water in the toilet tank 23, it tends to assume a position at an angle with the vertical. This restriction of the movement of the float 28 causes it to present a greater volume of its mass for displacement of water. The float 28 is made of extremely light material so that its center of floatation is located beneath its center of gravity on its vertical center axis. As it assumes a position at an angle to the vertical, the center floatation moves outwardly, increasing the moment arm of the buoyant force, thus increasing the effective force acting on rod 26. Thus in the last portion of its upward movement, the rapidity of its rise is increased and the force on rod 26 is also increased providing for a rapid final closure of the valve.

Hammer occurs when flow of a fluid under pressure in a line is rapidly terminated. By employing the two stage tandem closure of the present invention, the primary closure structure being one which does not completely seal off the fluid flow, hammer is eliminated. When the primary closure structure 24 closes, a small amount of flow is permitted to continue around the sides of the sleeve 43 preventing a shock in the line on closure. When complete sealing takes place an instant later at the secondary closure structure 25, the amount of flow is so reduced that no hammer occurs.

In the embodiment illustrated in Figs. 7 through 10, the float 28 is rigidly secured to control rod 26a by means of L-shaped float support arm 55.

Secured to the housing 32 is a U-shaped guide member 56. The float support arm 55 passes through the slot or groove 57 in the guide member 56; this prevents axial rotation of the control rod 26a and the valve plate 46 secured thereto. Secured to the float support arm 55 is a guide pin 58. The guide pin 58 engages cam surface 59 on the guide member 56.

In all other respects the structure illustrated in Figs. 7 through 10 is substantially identical with that illustrated in Figs. 1 through 6.

Fig. 7 shows the valve in the fully closed position, Fig. 8 shows the valve just as opening is commenced, and Fig. 9 illustrates the fully open position.

On opening, operation of the valve is substantially the same as described hereinabove for the first embodiment. After the support of water in the tank is moved, the weight of float 28 acting through the leverage of the horizontal portion of float support arm 55, tips the rod 26a to the right, cracking the valve and causing it to assume position shown in Fig. 8. Further downward movement of the float 28 moves the resilient member 47 away from the valve seat 45 into the fully open position shown in Fig. 9.

On closing, upward movement of the float 28 urges the valve plate 46 upwardly toward the valve seat 45. The guide pin 58 rides along the lower portion of cam surface 59 of the guide member 56 and holds the control rod 26a and the valve plate 46 thereon in the tilted position as shown in Figs. 8 and 9. The distance between the base of the guide member 56 and the point 61 on the cam surface 59 where the cam surface changes to a horizontal direction, is equal to the distance between the upper surface of the resilient member 47 and the surface of the valve seat 45. Thus when the pin arrives at the point 61, the resilient member 47 will just begin its engagement of the valve seat 45. (See Fig. 8.)

At this instant the horizontal portion of the cam surface 59 permits lateral movement of the float 28 and the float support arm 55, and the valve control rod 26a will be rotated in the counter-clockwise direction. The valve plate will also be rotated in a counter-clockwise direction, closing the valve plate in a hinge-like manner, with the valve plate pivoting about the valve seat 45 at the point of engagement with the valve seat. Further upward movement of the float 28 brings the valve plate 46 into firm engagement against the valve seat 45.

Thus, the guide pin 58 controls the movement of the valve plate 46, keeping it in the tilted position until the last moments before full closure by preventing lateral movement of the float support arm 55 and valve control rod 26a until said guide pin 58 moves past point 61. At this point further upward movement of the float 28 causes the guide pin to pass over the point 61 and "snap" up and over to the left, pivoting the valve plate 46 in a counter-clockwise direction as if it were hinged at the point of first contact between the resilient member 47 and the valve seat 45.

In the embodiment illustrated in Figs. 1 through 6 final closure is sudden and sharp since the valve plate is forced into the fully closed position in one movement and under line of pressure. This structure makes it necessary to provide a close tolerance between the exterior diameter of the valve sleeve 43 and the interior diameter of the tube 35 to hold the flow between those two members down to a minimum. If this is not done, the valve plate 46 will move into a fully closed position against the valve seat 45 with a noticeable tap. The close tolerance thus necessitated not only increases the cost of manufacture, but also may cause sticking in the valve as well as increasing the time of closure.

In the embodiment illustrated in Figs. 7 through 10, final closing is not abrupt since the hinge-like movement of the valve plate 46 in the final stages of closure provides a gradual final closure of the valve. This permits more rapid closure of the valve and also permits a greater tolerance or difference in diameters between the valve sleeve 43 and the interior of tube 35.

Moreover, by restricting the movement of the float 28 and holding it in a tilted position out of its normal floating position, until the guide pin 58 passes point 61, the snapping of the float 28 into its normal floating pobsition increases the rate of closure during the final stage thereof. As pointed out above normal closure at this final stage is very slow since the rate of inlet flow has been substantially reduced.

In the embodiment illustrated in Figs. 11 and 12 a different type of primary closure structure is illustrated along with a different means for initially cracking the valve located at the secondary closure structure.

In this embodiment, the primary closure structure comprises a pet cock 64 while the secondary closure structure 65 embodies a closure means similar to that employed in the secondary closure structure of the other embodiments discussed.

In this embodiment the water enters through inlet pipe 66, flows through the primary closure structure, which comprises pet cock 64, and into chamber 67, then down through the secondary closure structure 65 and out through outlet pipe 68.

The pet cock 64 has a cylinder 69 within bore 70 of casing 71. Rotation of cylinder 69 is controlled by shaft 72 which is provided with operating arm 73.

The cylinder 69 has an opening 74 which extends therethrough and which may be moved into register with apertures 75 in casing 71. The secondary closure structure 65 is provided with a valve seat 77 adapted to be covered by valve plate 78. Valve plate 78 has a smaller centrally located aperture, or bleed hole, 79 covered by small plate 80. Extending downwardly through aperture 79 and rigidly secured to small plate 80 is lug 81 through which extends pin 82. The pin 82 is of a length greater than the diameter of aperture 79.

The secondary closure structure 65 is operated by the same means as the primary closure structure, connecting arm 84 being secured to shaft 72 at one end and to small plate 80 at the other end.

It should be noted that the outer diameter of cylinder 69 is smaller than the interior of bore 70 in casing 71. Thus at all times a small amount of flow is permitted to leak from the inlet 66 through apertures 75 into chamber 67.

It should also be noted that opening 74 in cylinder 69 will not begin to register with apertures 75 in casing 71 until shaft 72 has been rotated approximately 10 degrees. This is done to insure the opening of the secondary closure structure 65 prior to the opening of the primary closure structure, pet cock 64, and to insure that the secondary closure structure 65 will always, during opening, present a greater effective area for flow therethrough than is presented at the primary closure structure 64.

Instead of cracking the secondary closure structure 65 by tipping the valve plate 78, initial opening of the secondary closure structure 65 occurs by moving the small plate 80 upwardly away from the bleed hole 79 in the valve plate 78. While appreciable force would be necessary to lift the entire valve plate 78 away from valve seat 77 against line pressure, since the area of bleed hole 79 is very small, the force necessary to lift small plate 80 is greatly reduced.

The valve is open by rotating operating arm 73 and shaft 72 thereon in a clockwise direction as seen in Fig. 12. The first effect of this is to lift small plate 80 from over bleed hole 79 permitting a small flow of water through the bleed hole to commence.

Once this is accomplished the valve plate 80 may be lifted from the valve seat 77 with a minimum of effort. Pin 82 will engage the underside of valve plate 78 and lift it away from valve seat 77.

Continued rotation of the operating arm 73 will move the valve plate 78 further away from the valve seat 77 and will bring the opening 74 in cylinder 69 into register with apertures 75 in casing 71, permitting full flow through the valve.

To close the valve, operating arm 73 is rotated in a counter-clockwise direction as shown in Fig. 12. First closure takes place at the primary closure structure 64 when the opening 74 moves out of register with apertures 75. Of course this is not a complete closure of the valve and flow will continue around cylinder 69 through the space provided between cylinder 69 and the inner walls of bore 70 within casing 71. Final closure will take place when the plate 78 is firmly seated against valve seat 77 along with small plate 80 being firmly seated over bleed hole 79.

It should be noted that the valve will provide a very tight closure with line pressure acting to seal the secondary closure structure 65 into a tightly closed position.

Fig. 13 illustrates a means for providing weight in the base of float 28 in place of lead weight 52. For this purpose there is provided a hollow hemispherical cup 86 secured to the base of the float 28 along its peripheral edges 87. A small aperture 88 is provided in the bottom of the cup and a larger aperture 89 is provided near the top edge of the cup. When the valve is closed, the cup 86 will be submerged and filled with water. When the toilet is flushed and the water in the storage tank 23 falls, the weight of the water in cup 86 will act in the manner similar to lead weight 52 to urge the float 28 downwardly and will aid in providing necessary force in cracking the valve. As the toilet flushes, the water in cup 86 will flow therefrom. When the water rises to the float 28, the cup will fill slowly and will not add appreciable weight to the float as the water urges it into the closed position.

Figs. 14 through 16 illustrate the application of the valve embodying the present invention to a faucet.

In a faucet in which the opening and closing of the valve is manual, the present invention has the added advantage of extreme ease of operation, permitting finger control of the valve.

As adapted for a faucet, the valve embodying the present invention comprises a primary closure structure 24 and a secondary closure structure 25. The housing 100 is secured to the inlet pipe by means of the conventional threaded nipple 101.

In the open position water enters into chamber 102 from the inlet pipe and then flows through apertures 103 in cylinder 104 into chamber 105.

The primary closure structure, as in the other embodiments of the invention, comprises a sleeve 106 pivotally mounted to rod 107 by pin 108. The sleeve 106 in its uppermost position is adapted to overlie and cover the apertures 103.

In the embodiment illustrated in Fig. 14, the secondary closure member 25 consists of a valve plate 110 having a resilient member 111 adapted to overlie and be sealed against the valve seat 112. In the embodiment illustrated in Fig. 14, the valve plate 110 is rigidly mounted to the control rod 107.

Since manual operation is expected for this valve, it is not necessary that opening be caused by a small force. For this reason initial cracking on opening of the valve may not be necessary since the purpose of initial cracking is primarily to permit a small exertion of force to initiate opening of the valve.

Passageway 113 and openings 114 lead the water from the secondary closure member 25 into the annularly shaped chamber 115 which connects with the spigot 116.

The operating handle 99 is pivotly mounted to the housing 100 at pivot point 119 and is secured to rod 107 by means of yoke 120, the yoke 120 being slightly larger than the portion of the handle 99 which passes therethrough.

A washer 121 is rigidly secured to rod 107 and firmly engages the inner side walls of the upper portion of the passageway 113 acting as a splash control member and preventing water from splashing out of the upper opening in housing 100.

As in all of the modifications of the present invention, the primary closure member 24 is constructed to always permit a flow therethrough even in its fully closed position so that flow will continue until the secondary closure structure 25 is in the fully closed position. This is accomplished by making the outside diameter of sleeve 106 slightly less than the inner diameter of cylinder 104.

In operation depression of the operating handle 99 first forces the resilient member 111 away from the valve seat 112. As soon as the secondary closure member 25 is slightly open, of course a small amount of flow will commence. This flow is almost negligible and consists of the amount of flow which is permitted to occur around sleeve 106. A further downward movement of the operating handle 99 likewise causes further downward movement of operating rod 107, moving the sleeve 106 into a position where it uncovers apertures 103.

As soon as apertures 103 are uncovered substantial flow will commence.

Since no force acts upon the operating rod 107 and the members of the valve secured thereto other than gravity, it may be held in position by simple friction either at the pivot point 119 or between the washer 121 and the inner walls of passage way 113.

Fig. 16 is a fragmentary enlarged view illustrating the use of a secondary closure member 25 in which the valve plate 110 is universally mounted at the upper end of the lower segment of control rod 123b, permitting initial cracking of the secondary closure member 25 on opening of the valve. The upper segment of the control rod 123a is rigidly secured to the valve plate 110. This construction will permit finger light control of the valve.

I claim:

1. A valve comprising a casing, said casing having therein an inlet aperture and an outlet aperture, a primary closure structure for restricting the flow of fluid through said inlet aperture and a secondary closure structure for restricting the flow of fluid and forming a fluid tight seal at said outlet aperture, a fluid connection between said inlet aperture and said outlet aperture; said casing at said inlet aperture being tubular in shape and said inlet aperture being located in the peripheral walls of said tubular portion of said casing, said primary closure structure comprising a hollow cylindrical sleeve positioned within the tubular portion of said valve casing and adapted to overlie said inlet apertures, said tubular sleeve having an outer diameter less than the inner diameter of said tubular portion of said casing, whereby flow of fluid will at all times be permitted to occur through said inlet apertures into said fluid connecting chamber; an operating rod for positioning said sleeve within said tubular portion of said casing, said sleeve being pivotally mounted on said operating rod; said secondary closure structure comprising a valve seat and a valve plate adapted to overlie and form a fluid tight seal with said valve seat, said valve plate being located on the positive pressure side of said outlet aperture, said valve plate being secured to said operating rod for universal movement relative thereto; a second operating rod rigidly secured to said valve plate; the distance between the upper edge of said inlet aperture and said valve seat being greater than the distance between the upper edge of said sleeve and the upper surface of said valve plate; a valve operating arm rigidly secured to said second operating rod at one end thereof, a guide bracket secured to said casing, said guide bracket having two upwardly extending portions, one portion located on each side of said operating arm, said operating arm having a transverse member thereon, said transverse member being of a length greater than the distance between the two upwardly extending portions of said guide member and engaging the surface of said guide member furthest from said second operating rod, said last mentioned surface of said guide member having an upper segment and a lower segment, and said upper segment and said lower segment being connected by a step segment forming a substantially horizontal surface, the vertical distance between said valve seat and said step segment of said guide surface of said guide member.

2. A valve comprising a primary closure structure and a secondary closure structure fluidly connected by a chamber; an inlet pipe and an outlet pipe, said primary closure structure comprising means for restricting the flow of fluid from said water inlet pipe into said chamber; said means always providing a small passageway for flow from said inlet pipe to said chamber; said secondary closure structure comprising means for restricting the flow of fluid from said chamber to said outlet pipe and for completely terminating said flow through said secondary closure structure; means for linking said primary closure structure and said secondary closure structure for concurrent operation to bring said primary closure structure on movement from open position to closed position to its point of maximum closure prior to the secondary closure structure reaching a point of closure in which the effective opening presented by said secondary closure structure is less than the small passageway for flow always provided at said primary closure structure; and means for preventing line pressure from urging said primary closure structure into the closed position.

3. A valve as claimed in claim 2, wherein said primary closure structure comprises a tube fluidly connecting said water inlet pipe with said chamber; said tube having apertures therein; a hollow cylindrical sleeve positioned concentric with said tube; and means for slideably moving said sleeve along the axis of said tube with relation to said apertures.

4. A valve as claimed in claim 2, wherein said secondary closure structure comprises a valve seat and a valve plate adapted to cover said valve seat to form a fluid seal between said chamber and said outlet pipe; and means for tipping said valve plate into a plane angularly disposed to the plane of the face of the valve seat.

5. A valve as claimed in claim 2, wherein said secondary closure structure comprises a valve seat and a valve plate adapted to cover said valve seat to form a fluid tight seal between said chamber and said outlet pipe, said valve plate having a small bleed hole therein, a covering plate for said bleed hole and means for moving said covering plate from said bleed hole without moving said valve plate.

6. A valve as claimed in claim 2, wherein said means for restricting the flow of fluid from said chamber to said outlet pipe and for completely terminating said flow through said secondary closure structure comprises a valve seat, and a valve plate adapted to cover said valve seat and form a fluid tight seal between the said chamber and said outlet pipe, said valve plate being located totally within said chamber and said valve seat and valve plate being located on the positive pressure side of said secondary closure structure.

7. A valve comprising a casing, said casing having an inlet aperture and an outlet aperture, a primary closure structure for restricting the flow of fluid through said inlet aperture and a secondary closure structure for restricting the flow of fluid through said outlet aperture, a fluid connecting chamber between the said inlet aperture and said outlet aperture, said secondary closure structure comprising means for forming a fluid tight seal at said outlet aperture, said primary closure structure comprising means for restricting the flow of fluid through said inlet aperture but always presenting a small passageway open to the flow of fluid therethrough and means for concurrent operation of said primary closure structure and said secondary closure structure to cause said primary closure structure to reach its fullest closed position prior in time to when the secondary closure structure reaches its fully closed position; means to prevent fluid pressure from urging said primary closure structure into its closed position or into its open position.

8. A valve comprising a casing, said casing having therein an inlet aperture and an outlet aperture, a primary closure structure for restricting the flow of fluid through said inlet aperture and a secondary closure structure for restricting the flow of fluid and forming a fluid tight seal at said outlet aperture, a fluid connecting chamber between said inlet aperture and said outlet aperture; the portion of said casing at said inlet aperture being tubular in shape and said inlet aperture being located in the peripheral walls of said tubular portion of said casing, said primary closure structure comprising a hollow cylindrical sleeve adapted to overlie said inlet aperture, and always presenting a small passageway between the wall of said sleeve and the wall of said casing open to the flow of fluid through said inlet aperture into said fluid connecting chamber; said secondary closure structure comprising a valve seat and a valve plate adapted to overlie and form a fluid tight seal with said valve seat, said valve plate being located on the positive pressure side of said outlet aperture.

9. A valve comprising a casing, said casing having therein an inlet aperture and an outlet aperture, a primary closure structure for restricting the flow of fluid through said inlet aperture and a secondary closure structure for restricting the flow of fluid and forming a fluid tight seal at said outlet aperture, a fluid connection between said inlet aperture and said outlet aperture; said primary closure structure comprising a covering member for said inlet aperture, said covering member being at all times located a small distance from inlet aperture; an operating rod for positioning said covering member relative to said inlet aperture; means to prevent line pressure from urging said covering member to move relative to its position with respect to the inlet aperture; said secondary closure structure comprising a valve seat and a valve plate adapted to overlie and form a fluid tight seal with said valve seat, said valve plate being secured to said operating rod, the distance between the portion of said inlet aperture closest to said outlet aperture and said valve seat being greater than the distance between the edge of said covering plate closest to said secondary closure structure and the upper surface of said valve plate.

10. A valve as claimed in claim 9, wherein means are provided for permitting said valve plate to assume a position in a plane angularly disposed to the plane of said valve seat.

11. A valve comprising a chamber, said chamber having an inlet aperture and an outlet aperture means located at one of said apertures for restricting the flow of fluid through said chamber and means located at the other of said apertures for terminating flow of fluid through said chamber, said two last mentioned means being linked together for tandem operation in which said means for restricting the flow of fluid through said chamber is brought into its position of maximum closure prior to the other of said fluid control means reaching its point of maximum closure, said means for terminating the flow of fluid through said chamber comprising a valve seat and a valve plate; said valve plate being located on the positive pressure side of said valve seat; and means for balancing the pressure differential on both sides of the means for the restricting the flow of fluid through said chamber to prevent said last mentioned means from being urged into the closed or open position by fluid pressure.

References Cited in the file of this patent
UNITED STATES PATENTS

| | | |
|---|---|---|
| 728,848 | Bradley | May 26, 1903 |
| 1,026,135 | Walther | May 14, 1912 |
| 1,223,170 | Hodgson | Apr. 17, 1917 |
| 1,703,295 | Cary | Feb. 26, 1929 |
| 1,787,601 | Swanberg | Jan. 6, 1931 |
| 2,214,863 | Schultheiss | Sept. 17, 1940 |
| 2,271,419 | Egan | Jan. 27, 1942 |
| 2,398,089 | Fehr | Apr. 9, 1946 |
| 2,405,476 | Weatherhead | Aug. 6, 1946 |
| 2,479,688 | Lindgren | Aug. 23, 1949 |
| 2,644,483 | Parker | July 7, 1953 |